US009873312B2

(12) United States Patent
Eckart et al.

(10) Patent No.: US 9,873,312 B2
(45) Date of Patent: Jan. 23, 2018

(54) DOOR IMPACT BEAM

(71) Applicant: Dr. Ing. h.c. F. Porsche Aktiengesellschaft, Stuttgart (DE)

(72) Inventors: Gerald Eckart, Maierhoefen (DE); Herbert Klamser, Korntal-Muenchingen (DE); Adriano Morozini De Lira, Stuttgart-Vaihingen (DE); Patrick Oefele, Eberdingen (DE); Philipp Straub, Stuttgart (DE); Joachim Ritter, Burladingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 29 days.

(21) Appl. No.: 15/209,772

(22) Filed: Jul. 14, 2016

(65) Prior Publication Data
US 2017/0028825 A1    Feb. 2, 2017

(30) Foreign Application Priority Data

Jul. 30, 2015 (DE) .......... 10 2015 112 499

(51) Int. Cl.
*B60J 5/00* (2006.01)
*B60J 5/04* (2006.01)

(52) U.S. Cl.
CPC ........... *B60J 5/0429* (2013.01); *B60J 5/0437* (2013.01); *B60J 5/0443* (2013.01); *B60J 5/0444* (2013.01)

(58) Field of Classification Search
CPC ........ B60R 21/0428; B60R 2021/0414; B60R 21/213; B60R 21/21; Y10T 29/49826; B65D 88/522; E06B 1/18; B60J 5/0437; B60J 5/0444; B60J 5/0429; B60J 5/0443; B62D 21/157
USPC .............................. 296/146.6, 146.1, 187.12
See application file for complete search history.

(56) References Cited

U.S. PATENT DOCUMENTS

| 4,684,166 | A | * | 8/1987 | Kanodia | ................ | B60J 5/0444 |
|---|---|---|---|---|---|---|
| | | | | | | 296/146.6 |
| 5,093,990 | A | | 3/1992 | Klippel | | |
| 5,124,186 | A | * | 6/1992 | Wycech | ................ | B60J 5/0444 |
| | | | | | | 264/46.6 |
| 5,232,261 | A | * | 8/1993 | Kuroda | ................ | B60J 5/0437 |
| | | | | | | 296/146.4 |

(Continued)

FOREIGN PATENT DOCUMENTS

| DE | 3606024 C2 | 8/1987 |
|---|---|---|
| DE | 19756459 A1 | 6/1999 |

(Continued)

*Primary Examiner* — Kiran B Patel
(74) *Attorney, Agent, or Firm* — Leydig, Voit & Mayer, Ltd.

(57) ABSTRACT

A door impact beam for a door of a motor vehicle includes a first fastening portion configured to be fastened to a first fastening intersection of the door and a second fastening portion configured to be fastened to a second fastening intersection of the door. A profiled portion extends between the first fastening portion and the second fastening portion. The profiled portion is designed at least in sections as a hollow profile with two side walls disposed opposite to each other and two connecting walls disposed opposite to each other which connect the side walls to each other. The connecting walls have an outwardly directed convex curvature.

10 Claims, 4 Drawing Sheets

(56) References Cited

U.S. PATENT DOCUMENTS

| | | | |
|---|---|---|---|
| 5,255,953 A | 10/1993 | Frank | |
| 5,404,690 A * | 4/1995 | Hanf | B60J 5/0437 29/897.2 |
| 5,452,545 A | 9/1995 | Siekmeyer et al. | |
| 5,580,120 A * | 12/1996 | Nees | B60J 5/0444 296/146.6 |
| 5,785,376 A * | 7/1998 | Nees | B60J 5/0444 296/146.6 |
| 5,857,734 A * | 1/1999 | Okamura | B60J 5/0451 280/748 |
| 5,925,314 A * | 7/1999 | Nishiguchi | C22C 21/00 148/415 |
| 6,082,811 A * | 7/2000 | Yoshida | B21C 23/205 296/146.6 |
| 6,302,474 B1 * | 10/2001 | Drysdale | B60J 5/0441 296/146.6 |
| 6,454,884 B1 * | 9/2002 | McNulty | B60J 5/0437 148/520 |
| 7,857,375 B2 * | 12/2010 | Huttsell | B60J 5/0425 296/146.6 |
| 2002/0069609 A1 * | 6/2002 | Nees | B60J 5/0444 296/202 |
| 2002/0153742 A1 * | 10/2002 | Ishikawa | B60J 5/0429 296/146.6 |
| 2003/0132643 A1 * | 7/2003 | Sakuma | B60J 5/0444 296/146.6 |
| 2005/0067856 A1 * | 3/2005 | Leistra | B60R 13/04 296/146.6 |
| 2006/0191731 A1 * | 8/2006 | Hashimoto | B60R 21/0136 180/274 |
| 2007/0145772 A1 * | 6/2007 | Rieder | B60J 5/0437 296/146.6 |
| 2010/0180990 A1 * | 7/2010 | Irander | B60J 5/0426 148/608 |
| 2012/0091750 A1 * | 4/2012 | Danaj | B60J 5/0443 296/146.6 |
| 2016/0303952 A1 * | 10/2016 | Hoff | B60J 5/0423 |
| 2017/0106917 A1 * | 4/2017 | Mashio | B62D 27/023 |
| 2017/0129429 A1 * | 5/2017 | Handing | B60R 19/18 |

FOREIGN PATENT DOCUMENTS

| | | |
|---|---|---|
| EP | 0425059 B1 | 5/1991 |
| EP | 0527700 A1 | 2/1993 |
| EP | 0584898 A1 | 3/1994 |
| EP | 0872291 A1 | 10/1998 |

* cited by examiner

DOOR IMPACT BEAM

CROSS-REFERENCE TO PRIOR APPLICATION

Priority is claimed to German Patent Application No. DE 10 2015 112 499.8, filed on Jul. 30, 2015, the entire disclosure of which is hereby incorporated by reference herein.

FIELD

The present invention relates to a door impact beam for the door of a motor vehicle and to a corresponding door of a motor vehicle.

BACKGROUND

It is fundamentally known that what are referred to as door impact beams are used in doors of motor vehicles in order to be able to provide appropriately greater stabilization effects in the event of a crash. Known vehicles thus have, within a door, what is referred to as side impact protection which can be provided, for example, by profiled portions of such a door impact beam. Such profiled portions are distinguished in that they provide a mechanical stabilizing effect when an action of force in the form of a collision takes place from the side of the door.

SUMMARY

In an embodiment, the present invention provides a door impact beam for a door of a motor vehicle. A first fastening portion configured to be fastened to a first fastening intersection of the door and a second fastening portion configured to be fastened to a second fastening intersection of the door. A profiled portion extends between the first fastening portion and the second fastening portion. The profiled portion is designed at least in sections as a hollow profile with two side walls disposed opposite to each other and two connecting walls disposed opposite to each other which connect the side walls to each other. The connecting walls have an outwardly directed convex curvature.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
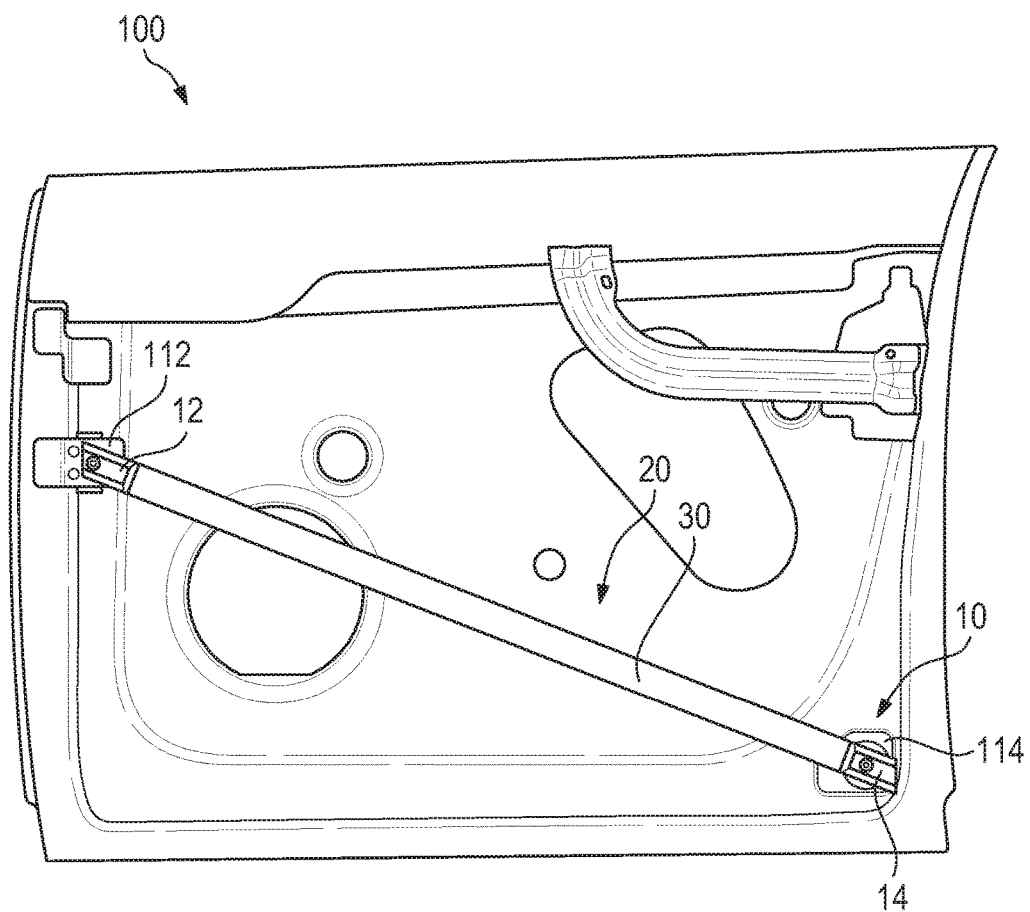
FIG. 1 shows a lateral illustration of a door according to an embodiment of the invention with a door impact beam according to an embodiment of the invention.

The inventors have recognized that it is disadvantageous in the case of the known door impact beams that the crash behavior is predictable only with difficulty. Accordingly, a high mechanical overall stability which is associated with a high weight of such a door impact beam was considered necessary in order reliably to avoid a profiled portion tearing off or bending.

In an embodiment, the present invention at least partially eliminates the above-described disadvantages in a cost-effective and simple manner. In particular, an embodiment of the present invention achieves a reinforcement of a door in the event of a crash in a cost-effective and simple manner.

In the following description, features and details which are described in conjunction with the door impact beam according to embodiments of the invention also apply here in conjunction with the door according to embodiments of the invention and vice versa in each case, and therefore, with regard to the disclosure, reference is always, and can always be, made reciprocally to the individual aspects of embodiments of the invention.

According to an embodiment of the invention, a door impact beam for a door of a motor vehicle is provided with a first fastening portion and a second fastening portion. The first fastening portion serves for the fastening of the door impact beam to the first fastening intersection of the door, and the second fastening portion serves for the fastening to a second fastening intersection of the door. A profiled portion extends here between the first fastening portion and the second fastening portion. A door impact beam according to an embodiment of the invention is distinguished in that the profiled portion is designed at least in sections as a hollow profile with two oppositely oriented side walls and two oppositely oriented connecting walls. Said connecting walls connect the side walls to each other, wherein the connecting walls have an outwardly directed convex curvature.

A door impact beam according to an embodiment of the invention is thus based on the basic design of known door impact beams, and therefore it can also be arranged in a known manner and especially in a similar positioning within a door. The fastening can take place here to already existing and previously known fastening intersections using corresponding first and second fastening portions.

A core concept of an embodiment of the present invention is that a specific design of the connecting walls within the hollow profile is provided. Said connecting walls connect the side walls such that the hollow profile is assembled. In other words, such a hollow profile is provided with a cavity which is bounded by the side walls on the left and right and by the connecting walls at the top and bottom, with respect to the fitted situation. The connecting walls and the side walls may, of course, be closed walls and may also have individual openings, bores or apertures.

A decisive effect of a door impact beam according to an embodiment of the invention is achieved by the fact that the connecting walls now have an outwardly directed convex curvature. In other words, the connecting walls have a bulbous bulge outward, i.e. away from the explained cavity of the hollow profile. This leads to the effect that, in the event of a crash, a specification of the direction of deformation is defined for said connecting walls. In other words, in the event of an action of force on the door, said action of force is transmitted to the side walls or in particular to the outwardly directed outer side wall of the profiled portion and therefore of the hollow profile. As soon as an outer skin of the door comes into contact with the side wall because of mechanical action, the force which is in effect can then also be transmitted to the side wall of the hollow profile. In the event of a crash, this customarily leads to a deformation, in particular plastically, of the associated side wall and therefore of the hollow profile. In other words, a force acting laterally will push the side wall further into the vehicle interior and will therefore carry out a plastic and/or elastic deformation of the connecting walls. Owing to the fact that the connecting walls have an outwardly directed convex curvature said deformation of the connecting walls will continue to follow said already defined convex curvature and will reinforce the latter. The specification of an outwardly directed convex curvature therefore defines the direction of deformation which the connecting walls will adopt in the event of a crash.

The effect achieved on the basis of the above unambiguous function, which is achievable according to an embodiment of the invention, in respect of a direction of deformation is that it is possible, with the greatest degree of certainty, for tearing off or bending to be avoided. The quality of the deformation and also the direction of deformation and the formation of the deformation can therefore be predefined. In other words, it is thereby possible, in the event of a crash, to be able to predict in a significantly more exact manner how the deformation will act on the door impact beam. As a result, it is possible to adapt the door impact beam in an exact manner to the deformation which is to be anticipated or predictable deformation and thereby significantly to reduce the geometrical design of said door impact beam and the associated weight of same. A lightweight construction possible in this manner, while maintaining mechanical stability and exacting safety requirements, leads to corresponding reduction in the fuel consumption of the vehicle and to improved driving properties.

An outwardly directed convex curvature of the connecting walls should be understood here as meaning in particular that said connecting walls have a radius of curvature, the center point of which accordingly lies on the inwardly facing side of said connecting walls, preferably within a cavity of said hollow profile. The deformation movement can also be described as squeezing together or as a concertina effect which correspondingly predefines said deformation of the connecting walls. It is accordingly also possible for the connecting walls to have different radii of curvature or for each connecting wall per se to have a variation of different radii of curvature. However, it is preferred if each connecting wall has substantially one radius of curvature for the outwardly directed convex curvature.

It can be of advantage if, in the case of a door impact beam according to an embodiment of the invention, the two connecting walls have an identical or substantially identical radius of curvature. This in particular also involves a correspondingly identical or substantially identical progression of radii of curvature over the axial progression. The connecting walls can thus have larger radii of curvature in subsections of the hollow profile than in other subsections. However, according to this particular embodiment of the present invention, the connecting walls on the respective portion of the hollow profile are formed symmetrically or identically to one another. This leads to the effect that, in the event of a crash at this position, a substantially identical or symmetrical deformation of the two connecting walls is carried out. An undesirable displacement of the door impact beam within the door is thereby effectively and especially cost-effectively avoided. The production is thereby also simplified since, in particular in the installation region, the associated profile can be used in both orientations because of the symmetrical design.

It is likewise advantageous if, in the case of a door impact beam according to an embodiment of the invention, the side walls and the connecting walls enclose a cavity of the hollow profile, wherein the curvature center points of the radii of curvature of the two connecting walls are arranged in said cavity. This leads to the effect that great advantages can be achieved in particular in respect of the geometrical correlation. The radii of curvature are thus small enough for the curvature center point to be able to be correspondingly arranged within the cavity of the hollow profile. In particular, this applies to the two curvature center points of the two connecting walls. It should be emphasized here that the curvature center points of the two connecting walls do not inevitably, but may, lie on one and the same curvature center point. The design of this variant leads to the effect that a good stability specification is normally provided and, in the event of a crash, a good specification of the desired direction of deformation is provided. In other words, this embodiment involves a particularly advantageous compromise solution between stability normally and deformation stability in the event of a crash.

According to an embodiment of the invention, it is furthermore of advantage if, in the case of a door impact beam according to an embodiment of the invention, the side walls have flat outer surfaces and/or flat inner surfaces at least in sections and in particular the side surfaces are arranged parallel to each other at least in sections. The design of flat outer surfaces and/or flat inner surfaces leads to a reduction in costs in the possibility of producing such a door impact beam since in particular an extrusion process can be used. Furthermore, the door impact beam is reduced in weight while the mechanical stability remains the same or substantially remains the same. A parallel or substantially parallel arrangement of the side surfaces with respect to each other leads to a symmetrical design and therefore to the possibility of a symmetrical or substantially symmetrical fitting in the case of a rectilinear progression. An improved absorption of forces in action in different crash directions can thereby also be provided.

It is furthermore advantageous if, in the case of a door impact beam according to an embodiment of the invention, the side walls protrude by an excess guide length at connecting points to the connecting walls. This means that a guide surface is provided by the excess guide length, said guide surface avoiding that, in the event of deformation, i.e. in the event of a crash, during the deformation of the connecting walls, said connecting walls are deformed beyond said excess guide length. In other words, said excess guide lengths also serve as certainty that a desired range of deformation to the sides of the connecting points will not be departed from. Furthermore, the excess guide length can also provide stability in the normal situation, in which a corresponding reduction in weight for the normal fitted situation is additionally achievable.

It is likewise advantageous if, in the case of a door impact beam according to an embodiment of the invention, the connecting walls have a smaller wall thickness than the side walls, in particular within the range of between approx. 0.5 and 0.9-times the wall thickness of the side walls. This reduction leads to the effect that the deformation within the profiled portion is substantially limited to a deformation of the connecting walls. This also leads to the effect that the prediction accuracy of the deformation to be anticipated in the event of a crash is improved even further. The advantages essential to an embodiment of the invention can thereby be achieved more accurately and better.

Furthermore, it is likewise of advantage if, in the case of a door impact beam according to an embodiment of the invention, the side wall of the hollow profile, which side wall, in the fitted situation, faces an outer skin of the door, as an outer side wall follows the progression of the contour of the outer skin of the door. This means that an outer skin of a door is customarily intended to achieve a corresponding optical and aerodynamic effect. Said outer skin is customarily not flat, but rather has a multiplicity of curvatures and bends or silhouette contours. The contour progression is preferably followed by the hollow profile and in particular by the outer side wall thereof, and therefore a distance between the contour of the outer skin of the door and the outer side wall correspondingly remains constant and/or within a predefined scope. This leads to the effect that the entire depth of the door can be significantly reduced since, even in the case of a complex outer skin, a chord between the two fastening portions would not provide an undesirable expansion of the depth of the door.

It is furthermore advantageous if, in the case of a door impact beam according to an embodiment of the invention, the progression of the outer side wall is designed in such a manner that a crash distance which is constant or is substantially constant over the progression of the side wall is formed between the outer side wall and the outer skin of the door in the fitted situation. In particular, for a constant or substantially constant design, fluctuations over the axial progression of the door impact beam of circa ±15% are conceivable. Such a crash distance can also be provided if the outer side wall encloses an angle of smaller than circa 30° with the associated outer wall of the door, in particular if a substantially parallel design is present. This leads to the effect that, irrespective of the point of action, for a crash force in the event of a crash, the necessary deformation of the outer skin for the desired contact with the outer side wall of the door impact beam remains substantially the same. Accordingly, buckling points are provided in the profile of the door impact beam, i.e. in the profiled portion or in the hollow profile, in order to be able to follow the progression of the outer skin or of the contour of the outer skin of the door as closely as possible.

It may be a further advantage if, in the case of a door impact beam according to an embodiment of the invention, at least the profiled portion and/or the hollow profile is designed as an aluminum extruded profile. This becomes possible in particular by the part of the profiled portion or of the hollow profile being provided by the simple and cost-effective construction of the connecting walls and of the side walls. The simple, cost-effective and especially weight-saving possibility of producing an aluminum extruded profile can be used in an embodiment of the present invention.

An embodiment of the present invention likewise relates to a door of a motor vehicle, having at least one door impact beam according to the invention. By means of the use of such a door impact beam, a door according to the invention affords the same advantages as have been explained in detail with regard to a door impact beam according to embodiments of the invention. Said door impact beam is accordingly fastened by the two fastening portions thereof to the associated fastening intersections of the door and is thereby ready for use in order to be able to provide the desired stabilization function in the event of a crash.

FIG. 1 shows an embodiment of a door 100 according to an embodiment of the invention in an open illustration. This permits access here to the inner workings of said door 100, and therefore the two fastening intersections 112 and 114 are visible. A door impact beam 10 is fastened by the two fastening portions 12 and 14 thereof here to said two fastening intersections 112 and 114. This fastening can be provided, for example, by rivets, screws or else by a welded joint.

In this embodiment, the door impact beam 10 runs from the left at the top to the right at the bottom, wherein the driving direction in FIG. 1 for the associated vehicle is oriented from the right to the left.

Figure 2:
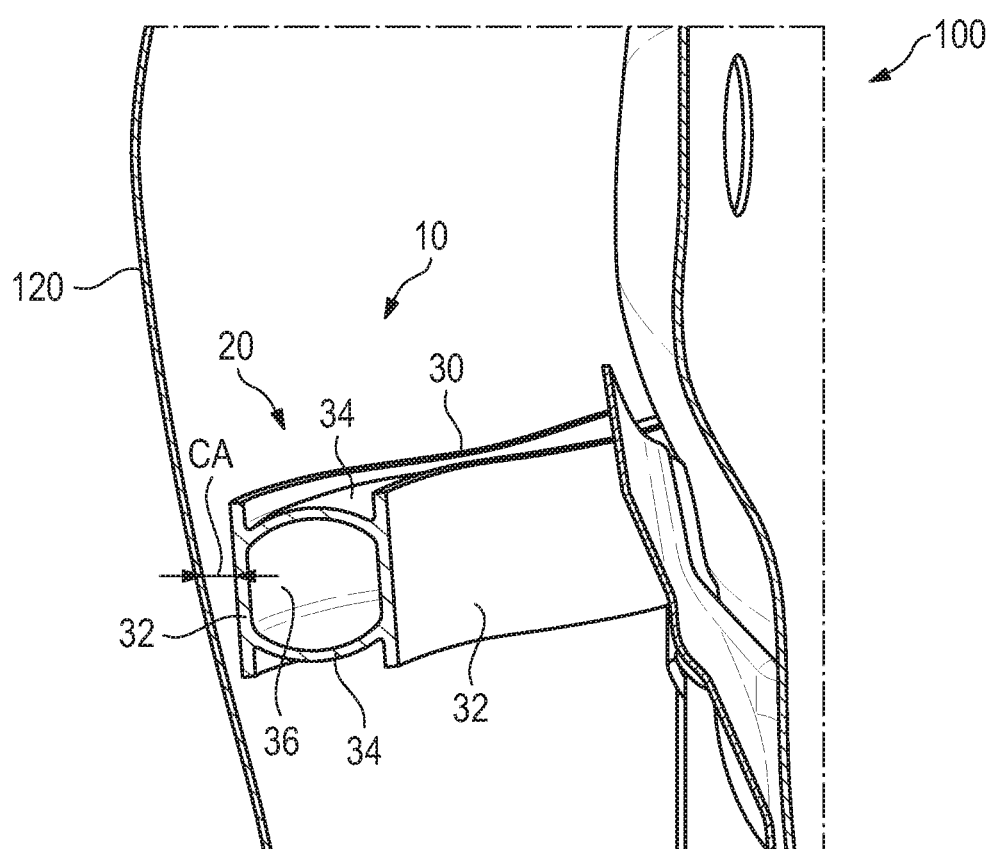
FIG. 2 shows the embodiment of FIG. 1 in a three-dimensional cross section.
Figure 3:
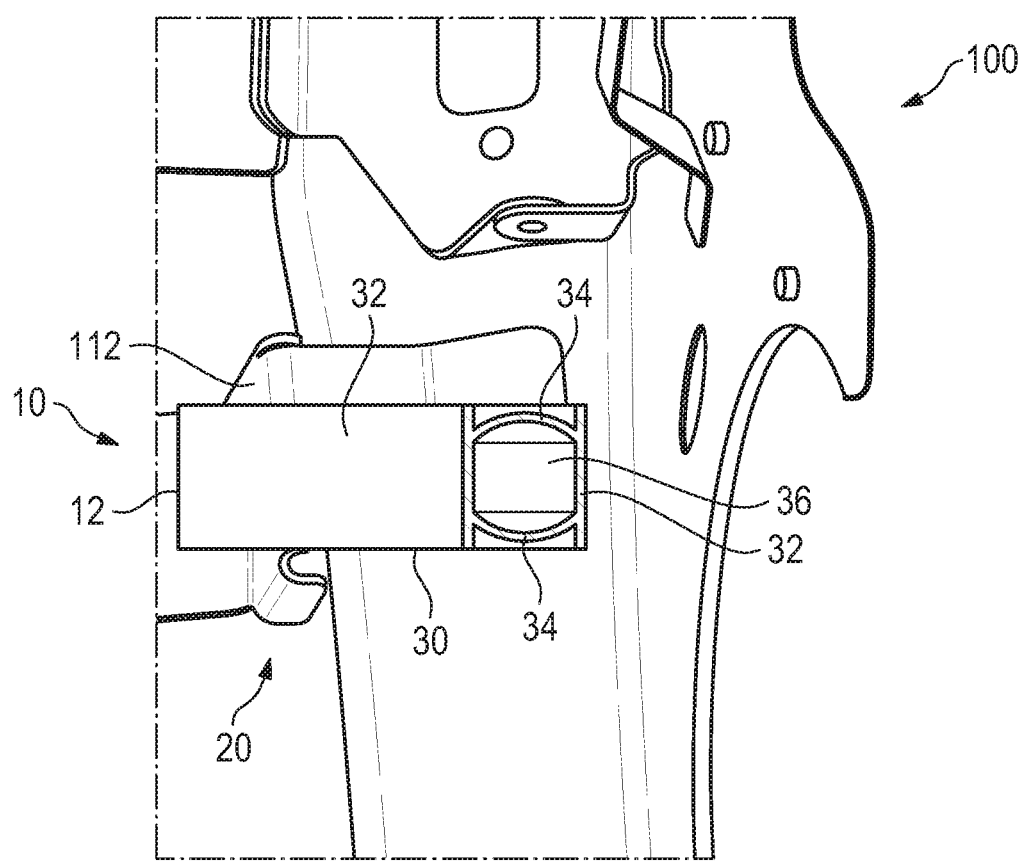
FIG. 3 shows the embodiment of FIGS. 1 and 2 in another three-dimensional cross section.

The configuration according to an embodiment of the invention of the door impact beam 10 is shown in particular in FIGS. 2 and 3 which illustrate a cross section through the associated profiled portion 20 and the hollow profile 30 provided there. It can readily be seen here that the hollow profile 30 is configured with two substantially flat side walls 32. Said two side walls 32, which may also be referred to as outer side wall 32 and inner side wall 32, are connected by bulbous connecting walls 34 which have an outwardly directed convex curvature. In this embodiment, the two connecting walls 34 are formed with the same or identical radii of curvature. An outer side wall 32 is defined here by the fact that it is arranged with a crash distance CA closer to an associated outer skin 120. As FIG. 1 and also FIG. 2 show, buckling points provided within the profiled portion 20 and therefore also by the hollow profile 30 may, of course, be provided in order to be able to follow an associated contour of the outer skin 120 as closely as possible and with a crash distance CA which is as constant as possible.

Figure 4:
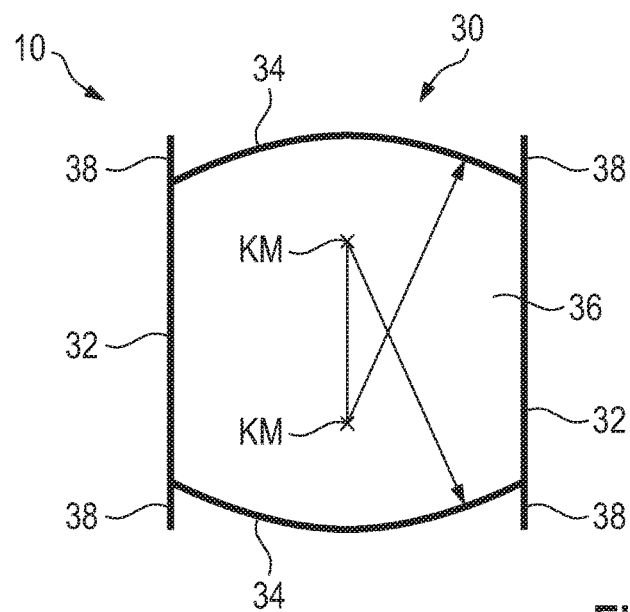
FIG. 4 shows a further embodiment of a door impact beam according to the invention.
Figure 5:
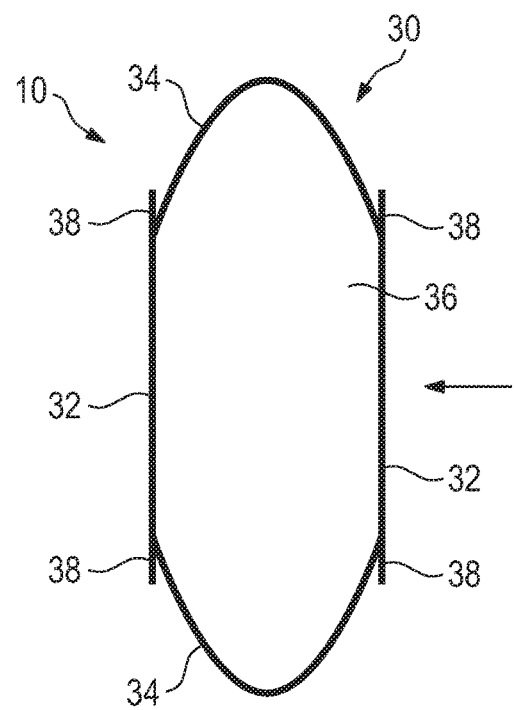
FIG. 5 shows the embodiment of FIG. 4 during deformation in the event of a crash.

It is now explained schematically in FIGS. 4 and 5 below how the desired effect is achieved in the event of a crash. FIG. 4 shows, in a schematic cross section, an embodiment of a door impact beam 10 which is provided with two connecting walls 34 of bulbous configuration. The two connecting walls 34 are provided with identical or substantially identical radii of curvature which are represented by the two arrows. This leads to the effect that, although the two associated curvature center points KM are arranged at different points, they are both arranged within the cavity 36 of the hollow profile 30.

Furthermore, excess guide lengths 38 which can deploy a corresponding guiding effect in the event of a crash are provided here. If a lateral force, as illustrated by the arrow in FIG. 5, then acts in the event of a crash, an elastic and/or plastic deformation of the door impact beam 10 and in particular of the hollow profile 30 will occur. Squeezing and therefore an additional bulging of the connecting walls 34, as FIG. 5 illustrates, follows. The predefined curvature will be reinforced in this manner, and therefore the direction of deformation is thereby predefined by the predefined curvature and is therefore predictable. As FIG. 5 also clearly shows, the excess guide lengths 38 serve here to the effect that an overturning of the connecting walls 34 in the event of the deformation to the left and right beyond the side walls 32 is able to be avoided substantially completely and with a high degree of certainty.

The above explanation of the embodiments describes the present invention exclusively within the scope of examples. Of course, individual features of the embodiments, if technically expedient, can be freely combined with one another without departing from the scope of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A door impact beam for a door of a motor vehicle, the door impact beam comprising:
    a first fastening portion configured to be fastened to a first fastening intersection of the door;
    a second fastening portion configured to be fastened to a second fastening intersection of the door; and
    a profiled portion which extends between the first fastening portion and the second fastening portion, the profiled portion being designed at least in sections as a hollow profile with two side walls disposed opposite to each other and two connecting walls disposed opposite to each other which connect the side walls to each other, wherein the connecting walls have an outwardly directed convex curvature.

2. The door impact beam as claimed in claim 1, wherein the two connecting walls have an identical or substantially identical radius of curvature.

3. The door impact beam as claimed in claim 1, wherein the side walls and the connecting walls enclose a cavity of the hollow profile, and wherein curvature center points of radii of curvature of the two connecting walls are arranged in the cavity.

4. The door impact beam as claimed in claim 1, wherein the side walls have at least one of flat outer surfaces or flat inner surfaces at least in sections, and wherein the side walls are arranged parallel to each other at least in sections.

5. The door impact beam as claimed in claim 1, wherein the side walls protrude by an excess guide length at connecting points to the connecting walls.

6. The door impact beam as claimed in claim 1, wherein the connecting walls have a smaller wall thickness than the side walls within a range of between about 0.5 and 0.9 times the wall thickness of the side walls.

7. The door impact beam as claimed in claim 1, wherein one of the side walls of the hollow profile, which in a fitted situation, faces an outer skin of the door, is an outer side wall that follows a progression of a contour of the outer skin of the door.

8. The door impact beam as claimed in claim 7, wherein the progression of the outer side wall is designed in such a manner that a crash distance which is constant or is substantially constant over the progression of the outer side wall is formed between the outer side wall and the outer skin of the door in the fitted situation.

9. The door impact beam as claimed in claim 1, wherein at least one of the profiled portion or the sections thereof design as the hollow profile is designed as an aluminum extruded profile.

10. A door of a motor vehicle having at least one door impact beam comprising:
    a first fastening portion fastened to a first fastening intersection of the door;
    a second fastening portion fastened to a second fastening intersection of the door; and
    a profiled portion which extends between the first fastening portion and the second fastening portion, the profiled portion being designed at least in sections as a hollow profile with two side walls disposed opposite to each other and two connecting walls disposed opposite to each other which connect the side walls to each other, wherein the connecting walls have an outwardly directed convex curvature.

* * * * *